United States Patent

Jung

Patent Number: 5,901,905
Date of Patent: May 11, 1999

[54] METHOD AND APPARATUS FOR CONTROLLING AN OPERATION OF A HUMIDIFIER

[75] Inventor: Woong Jung, Seoul, Rep. of Korea

[73] Assignee: Daewoo Electronics Co., Ltd., Rep. of Korea

[21] Appl. No.: 08/988,454

[22] Filed: Dec. 10, 1997

[30] Foreign Application Priority Data

Mar. 31, 1997 [KR] Rep. of Korea ............... 97-11932

[51] Int. Cl.$^6$ ............................................. G05D 22/00
[52] U.S. Cl. ............... 236/44 C; 236/91 C; 165/229; 261/DIG. 34
[58] Field of Search ................ 236/44 R, 44 A, 236/44 B, 44 C, 44 E, 91 C; 165/222, 223, 224, 225, 226, 229; 261/142, DIG. 48, DIG. 34

[56] References Cited

U.S. PATENT DOCUMENTS

| | | | |
|---|---|---|---|
| 4,183,224 | 1/1980 | Rule, III et al. | 62/91 |
| 4,333,490 | 6/1982 | Enter, Sr. | 137/78.3 |
| 4,643,351 | 2/1987 | Fukamachi et al. | 236/44 E |
| 4,718,244 | 1/1988 | Kobayashi | 236/44 C X |
| 4,856,227 | 8/1989 | Oglevee et al. | 236/44 C X |
| 5,343,551 | 8/1994 | Glucksman | 392/405 |

FOREIGN PATENT DOCUMENTS

| | | |
|---|---|---|
| 0 067 979 | 5/1982 | European Pat. Off. . |
| 2 270 153 | 3/1994 | United Kingdom . |
| 2 195 434 | 4/1998 | United Kingdom . |

Primary Examiner—Harry B. Tanner
Attorney, Agent, or Firm—Pillsbury Madison & Sutro, LLP

[57] ABSTRACT

A method and an apparatus for sensing an illuminance and a temperature around a humidifier and controlling a humidifying operation is disclosed. An illuminance inside a room in which a humidifying operation is applied by the humidifier is sensed by an illuminance sensor. The humidifying operation of the humidifier is operated in a sleeping humidification mode when the sensed illuminance is lower than a reference illuminance. The humidifying operation of the humidifier is operated in a normal humidification mode when the sensed illuminance is higher than the reference illuminance. A temperature inside the room in which the humidifying operation is applied by the humidifier is sensed by a temperature sensor. The humidifier executes a heater humidification and an ultrasonic humidification when the sensed temperature is lower than a reference temperature. The humidifier stops the heater humidification and executes the ultrasonic humidification when the sensed temperature is higher than the reference temperature. Accordingly, the humidifier provides an agreeable humidification environment to the user whether the user is sleeping or is awake.

13 Claims, 3 Drawing Sheets

METHOD AND APPARATUS FOR CONTROLLING AN OPERATION OF A HUMIDIFIER

BACKGROUND OF THE INVENTION

1. Field of the Invention

The present invention relates to a method and an apparatus for controlling the humidity amount from a humidifier and a humidifying system thereof according to an illuminance and a temperature sensed inside a room in which a humidifying operation is applied.

2. Description of the Prior Art

In general, at home or in offices, cooling or heating equipments, for example air-conditioners, motor fans, boilers and heaters, etc. are operated in order to adequately maintain an indoor temperature which changes according to a season and an outside temperature. When air inside a room becomes dry by the cooling or heating equipment and if the dried air stimulates respiratory organs of people, various kinds of disease including a respiratory disease can be generated.

Especially, when various electric appliances, for example, television sets, personal computers, refrigerators, air-conditioners, video cassette recorders and audio reproducing systems, etc. are installed and used in homes or offices, the heat which is generated by operation of the electric appliances increases the indoor temperature while decreasing the indoor humidity. Such dry air can injure people's health and can generate a fatal influence upon the health of children and the old. Accordingly, humidifiers are one of the various means which maintain an indoor humidity at a desired level to support an agreeable environment inside the room.

The humidifier changes water which is filled in a humidifying chamber into minute particles by a vaporizing process and continuously discharges the water vapor to the space inside the room. Accordingly, the indoor humidity is controlled to within the range which a user desires.

For example, U.S. Pat. No. 4,183,224 which is granted to Adrian O. Rule III discloses a method for minimizing the use of energy by adopting the principle that the relative indoor humidity and temperature is maintained within a precise range and moisture is added all the time. Rule III's humidifying apparatus achieves a substantially uniformed distribution of the air throughout the space by circulating a predetermined volume of air through the control space. In addition, it thoroughly mixes into the main stream a small portion of makeup air at a controlled humidity and temperature level to return the main stream to about the desired temperature and humidification levels and selectively cooling the main stream of air with makeup air mixed without stripping any moisture therefrom. Also, it adds moisture to the mixed air flow stream to bring the humidification level up and provides moving force to the air stream immediately subsequent to moisture addition to uniformly distribute the moisture throughout the air stream.

However, the above conventional humidifier executes a humidifying operation in a normal humidification mode which the user selects before sleeping even though the user turns off the light to sleep. In addition, in case of a humidifier which uses both a heater humidifier which heats water by a heater to execute the humidifying operation and an ultrasonic humidifier which heats water by using an ultrasonic vibrator to execute the humidifying operation, the user selects and executes either a heater humidification, an ultrasonic humidification or the heater humidification in combination with the ultrasonic humidification after considering the indoor temperature condition. Accordingly, the conventional humidifiers cannot provide an agreeable sleeping environment while the user sleeps and also the user can catch a cold or can have his respiratory organs injured while the user is sleeping or is awake inside rooms where air does not have an agreeable level of the humidity.

SUMMARY OF THE INVENTION

Therefore, it is an object of the present invention to provide a method in which an illuminance is sensed inside a room and the sensed illuminance is used to agreeably control an amount of water vapor discharging from a humidifier.

It is another object of the present invention to provide a method in which a temperature is sensed inside a room and the sensed temperature is used to selectively control a humidifying system of a humidifier.

It is another object of the present invention to provide an apparatus for sensing an illuminance inside a room in which a humidifying operation is applied and for agreeably controlling a humidity amount from a humidifier based on the sensed illuminance.

Furthermore, it is another object of the present invention to provide an apparatus for sensing a temperature inside a room in which a humidifying operation is applied and for selectively controlling a humidifying system of a humidifier based on the sensed temperature.

In order to achieve the above objects, the present invention provides a method for controlling an operation of a humidifier, which comprises:

(i) sensing a present humidity, a present temperature and a present illuminance inside a room;

(ii) judging whether or not water exists in a humidifying chamber after whether a user operates a power switch to supply a power source;

(iii) setting an objective humidity and comparing the set objective humidity with the present humidity sensed in step (i) when it is judged in step (ii) that the water exists in the humidifying chamber;

(iv) selecting and executing a humidifying method based on the present temperature sensed in step (i) when it is judged in step (iii) that the objective humidity is higher than the present humidity; and (v) selecting a humidification mode and executing a humidifying operation in the selected mode based on the present illuminance sensed in step (i).

In order to achieve the above objects, the present invention provides an apparatus for controlling an operation of a humidifier, which comprises:

key inputting means for allowing a user to set humidifying operation conditions of a humidifier through keys thereof and for providing operation setting signals inputted through the keys by an user;

a humidity sensor for sensing a humidity inside a room to in which a humidifying operation is applied and for providing a sensed humidity signal;

a temperature sensor for sensing a temperature inside the room in which the humidifying operation is applied and for providing a sensed temperature signal;

a float switch for executing a switching operation based on a level of water flowed from a water chamber provided inside of the humidifier and for providing an ON/OFF switching signal;

an illuminance sensor for sensing an illuminance inside the room in which the humidifying operation is applied and for providing the sensed illuminance signal;

control means for providing first to third driving control signals in order to control a present humidity inside the room to obtain the objective humidity in response to the operation setting signals from said key inputting means, the sensed humidity signal from said humidity sensor, the sensed temperature signal from said temperature sensor, the on/off switching signal from said float switch, and the sensed illuminance signal from said illuminance sensor, and for providing a fourth driving control signal in order to control devices for displaying an operation state of the humidifier;

heater driving means for executing a heat humidifying operation by quantity of heat of a heater in response to the first driving control signal from said control means;

vibrator driving means for executing an ultrasonic humidifying operation by ultrasonic waves of a vibrator in response to the second driving control signal from said control means;

motor driving means, responsive to the third driving control signal from said control means, for driving a fan motor and a fan provided inside of the humidifier to send a power discharging vapor produced by the driving of the heater and the vibrator through an outlet of the humidifier to the periphery thereof;

displaying means, responsive to the fourth driving control signal from said control means, for driving a buzzer and operation display lamps informing that the water does not exist in a humidifying chamber; and a memory, responsive to a writing/reading control signal from said control means, for writing or reading data related to the operation setting signals from said key inputting means, and for sensing signals from said sensors.

In the method and apparatus for controlling an operation of a humidifier according to the present invention, when the present illuminance sensed around a humidifier is lower than the reference illuminance, the humidification mode of the humidifier is executed in a sleep mode in which a humidification amount is low, so that the humidifier provides an agreeable sleeping environment when a user sleeps.

In addition, when the present temperature sensed around the humidifier is higher than the reference temperature, the humidifier operates in an ultrasonic humidification mode. When the presently-sensed temperature is lower than the reference temperature, the humidifier operates in the heater humidification mode in combination with the ultrasonic humidification mode. Consequently, the humidifier provides an environment where the air has an agreeable level of humidity.

BRIEF DESCRIPTION OF THE DRAWINGS

The above objects and other advantage of the present invention will become more apparent by describing in detail a preferred embodiment thereof with reference to the attached drawings, in which.

DESCRIPTION OF THE PREFERRED EMBODIMENT

A description will be given below in detail with reference to the accompanying drawings to a configuration and an operation of a method and an apparatus for controlling an operation of a humidifier according to an embodiment of the present invention.

Figure 1:
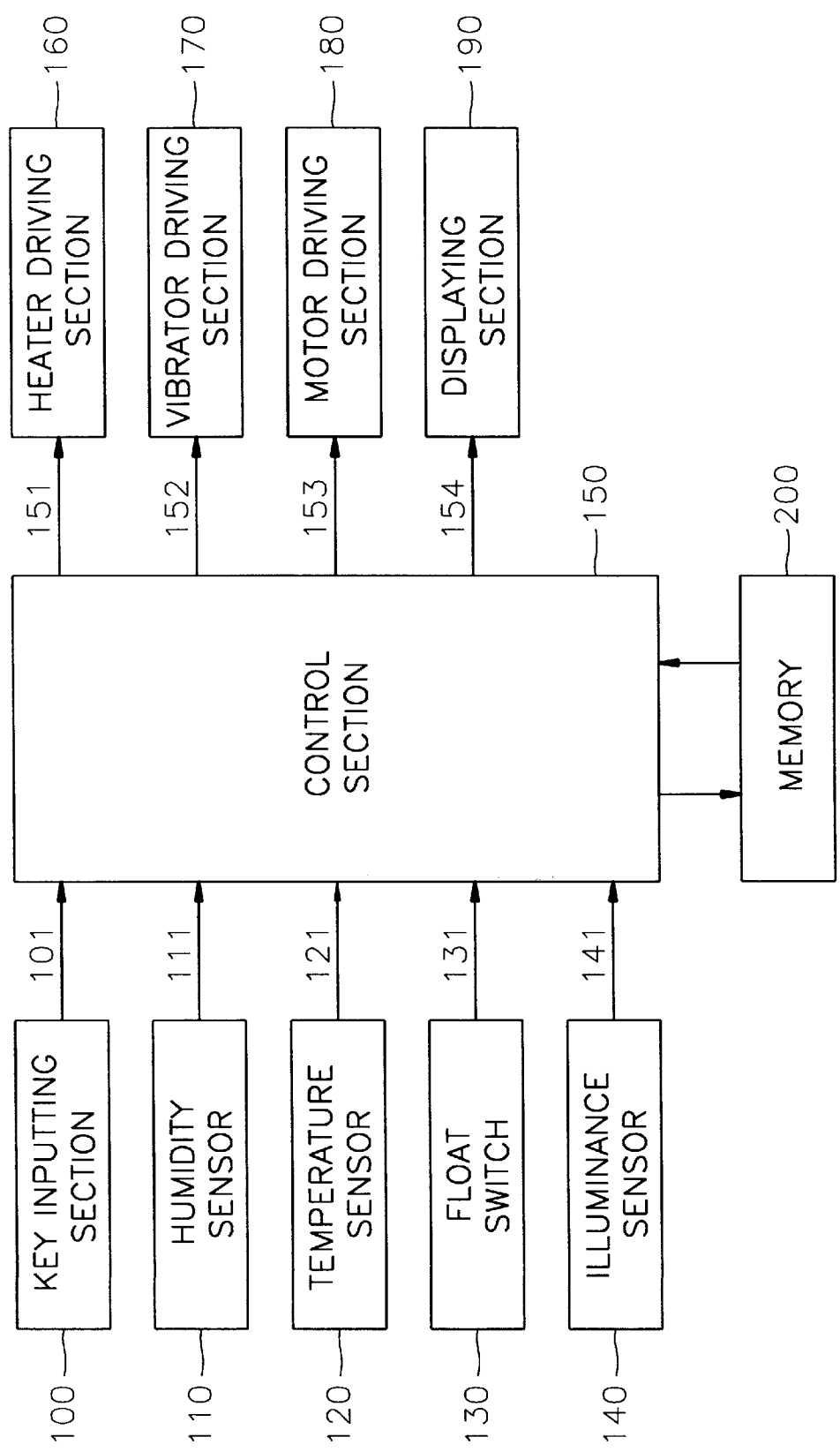
FIG. 1 is a block diagram for showing the circuit configuration of an apparatus for controlling an operation of a humidifier according to the present invention.

FIG. 1 is a block diagram for showing the circuit configuration of an apparatus for controlling an operation of a humidifier according to an embodiment of the present invention. As shown in FIG. 1, the apparatus for controlling an operation of a humidifier comprises a key inputting section 100, a humidity sensor 110, a temperature sensor 120, a float switch 130, an illuminance sensor 140, a control section 150, a heater driving section 160, a vibrator driving section 170, a motor driving section 180, a displaying section 190 and a memory 200.

Key inputting section 100 allows a user to set humidifying operation conditions of a humidifier through keys thereof and provides operation setting signals 101 which are inputted through the keys by a user to the control section 150.

Humidity sensor 110 is disposed outside of the humidifier, senses a humidity inside a room in which a humidifying operation is applied, and provides the sensed humidity signal 111 to the control section 150.

Temperature sensor 120 is disposed of the outside of the humidifier, senses a temperature inside the room in which the humidifying operation is applied, and provides the sensed temperature signal 121 to the control section 150.

Float switch 130 executes a switching operation based on a level of water flowed from a water chamber which is provided inside the humidifier, and provides an ON/OFF switching signal 131 to the control section 150.

Illuminance sensor 140 senses an illuminance inside the room in which the humidifying operation is applied and provides the sensed illuminance signal 141 to the control section 150.

Control section 150 provides first to third driving control signals 151, 152, 153 to the heater driving section 160, the vibrator driving section 170, and the motor driving section 180, respectively, in order to control the present humidity inside the room to obtain the objective humidity, and provides a fourth driving control signal 154 to the displaying section 190 in order to control devices for displaying an operation state of the humidifier in response to the operation setting signals 101 from the key inputting section 100, the sensed humidity signal 111 from the humidity sensor 110, the sensed temperature signal 121 from the temperature sensor 120, the ON/OFF switching signal 131 from the float switch 130 and the sensed illuminance signal 141 from the illuminance sensor 140.

Heater driving section 160 executes a heat humidifying operation by quantity of heat of a heater in response to the first driving control signal 151 from the control section 150.

Vibrator driving section 170 executes an ultrasonic vibration humidifying operation by ultrasonic waves of a vibrator according to the second driving control signal 152 from the control section 150.

Motor driving section 180, responsive to the third driving control signal 153 from the control section 150, drives a fan motor and a fan which is provided inside of the humidifier to send a power discharging vapor produced by the driving of the heater and the vibrator through an outlet of the humidifier to the periphery thereof.

Displaying section 190, responsive to the fourth driving control signal 154 from the control section 150, drives a buzzer and operation display lamps informing that the water does not exist in a humidifying chamber. Also, the displaying section 190 indicates that the sensed humidity signal 111 from the humidity sensor is higher than the objective humidity which is set by the key operation of the user.

Memory 200, responsive to a writing signal/reading signal from the control section 150, writes or reads data related to the operation setting signals 101 from the key inputting section 100 and to the sensing signals 111, 121, 131, 141 from the sensors 110, 120, 130, 140.

A description will be made next of the procedure of the method for controlling an operation of a humidifier which is performed by the apparatus shown in FIG. 1, in accordance with the flowcharts of FIGS. 2 to 3.

Figure 2:
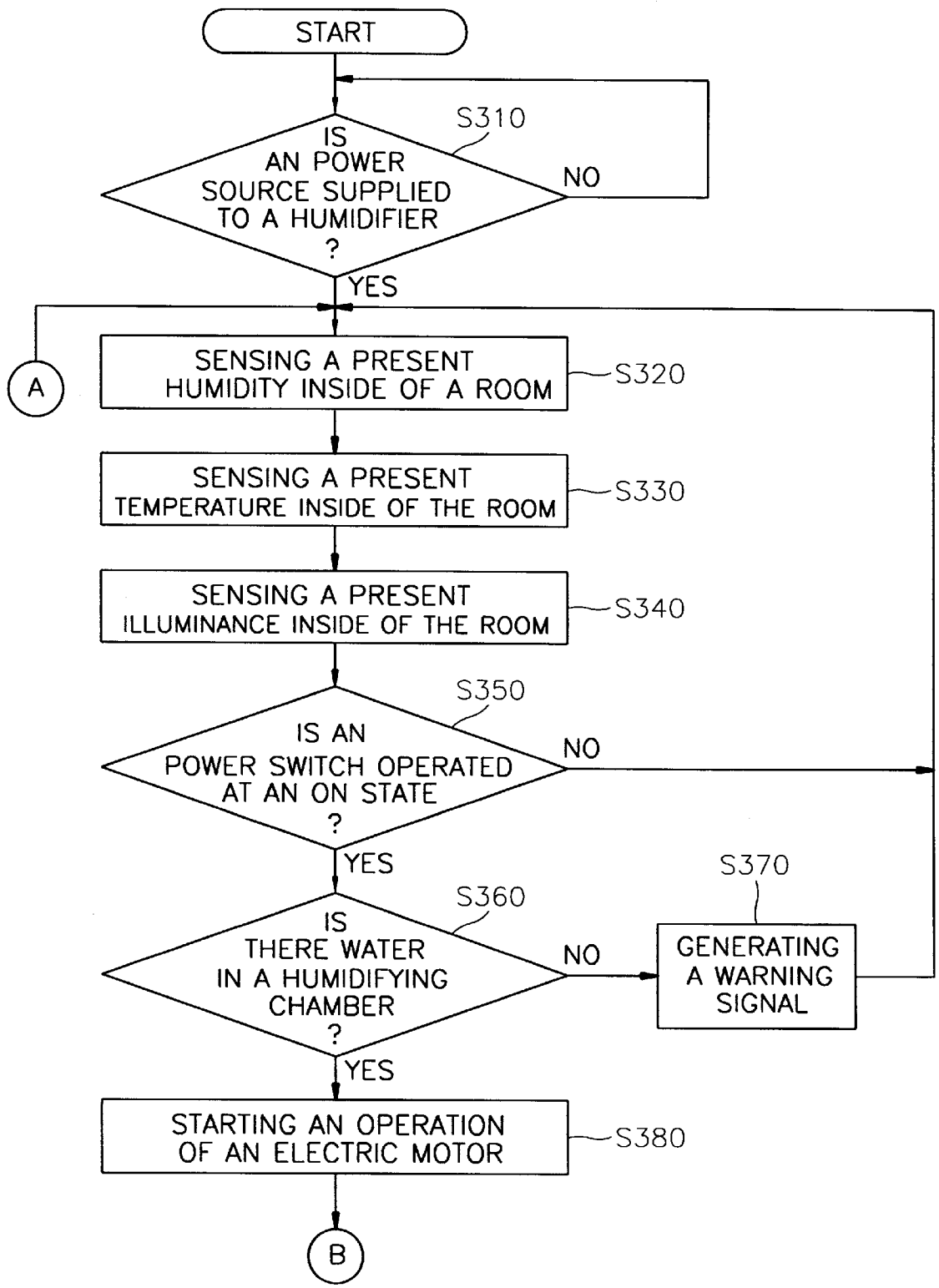
FIGS. 2 to 3 are a flowchart for illustrating a method for controlling an operation of a humidifier by using the apparatus shown in FIG. 1.
Figure 3:
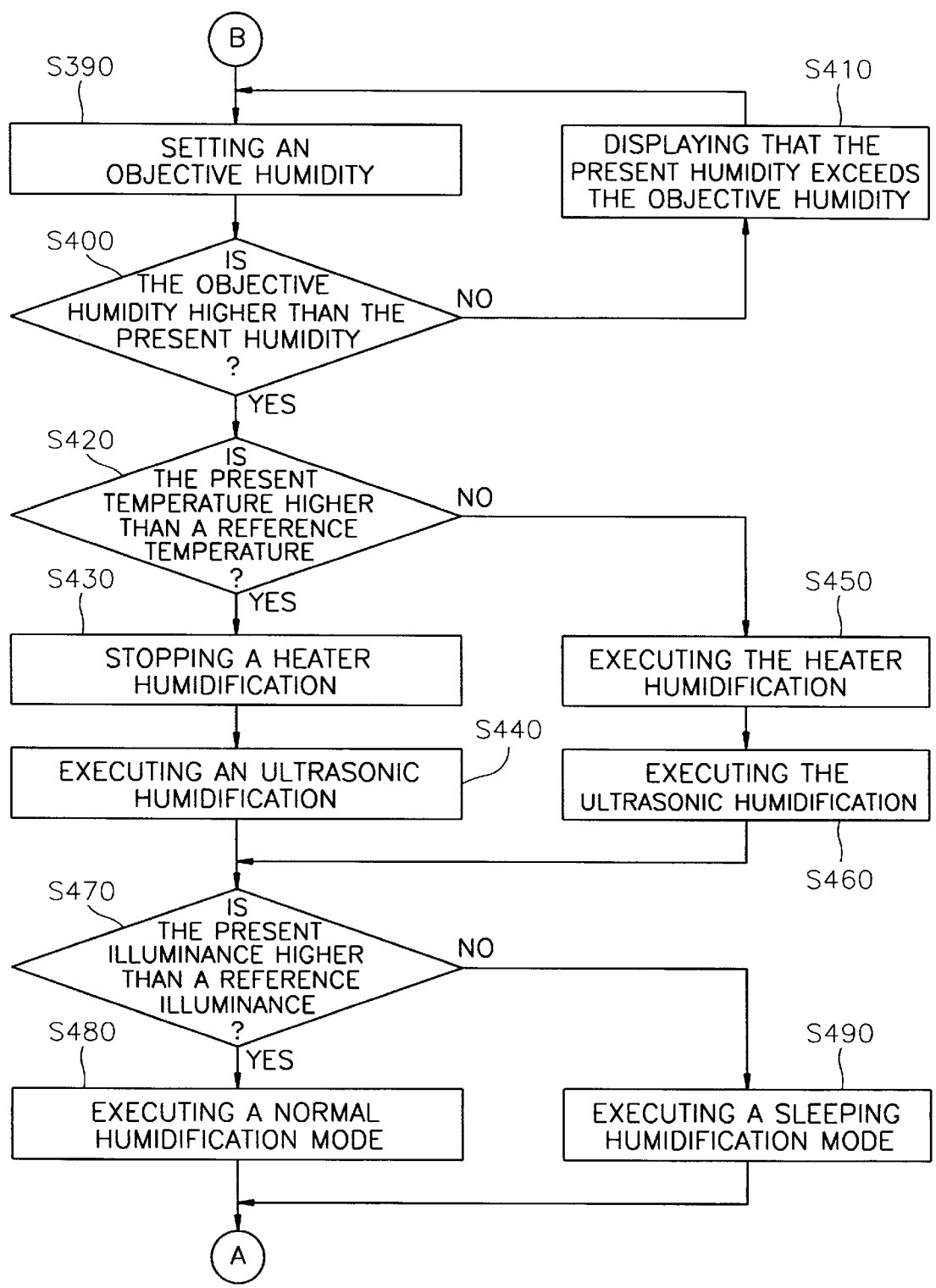

FIGS. 2 to 3 are flowcharts for illustrating a method for controlling an operation of a humidifier by using the apparatus which is shown in FIG. 1.

As shown in FIGS. 2 to 3, control section 150 judges whether or not a power source is supplied to the humidifier based on whether the user has plugged in an external power plug(step S310).

When it is judged in step S310 that the power source is not supplied, control section 150 repeatedly executes the step S310.

When it is judged in step S310 that the power source is supplied, control section 150 proceeds to the next step.

In step S320, S330 and S340, control section 150 senses a present humidity, a present temperature and a present illuminance inside the room in response to the sensed humidity signal 111 from the humidity sensor 110, the sensed temperature signal 121 from the temperature sensor 120 and the sensed illuminance signal 141 from the illuminance sensor 140.

Control section 150 judges whether or not a power switch is turned ON by the user(step S350).

When it is judged in step S350 that the power switch is not turned ON, control section 150 returns to step S320.

When it is judged in step S350 that the power switch is turned ON, control section 150 judges whether or not water exists in a humidifying chamber based on the ON/OFF switching signal 141 from the float switch 131(step S360).

When it is judged in step S360 that the water does not exist in the humidifying chamber, control section 150 provides the fourth driving control signal 154 to the displaying section 190 in order to drive a buzzer and operation display lamps informing that the water does not exist in the humidifying chamber, generates a warning signal, and returns to step S320(step S370).

When it is judged in step S360 that the water exists in the humidifying chamber, control section 150 provides the third driving control signal 153 to the motor driving section 180 and starts an operation of the motor, which drives a fan(step S380).

In step S390, when the user operates the keys of the key inputting section 100 and inputs an objective humidity, the objective humidity is stored in the memory 190.

In step S400, control section 150 compares the present humidity sensed in step S320 with the objective humidity set in step S390.

When it is judged in step S400 that the objective humidity is not higher than the present humidity, control section 150 outputs the fourth driving control signal 154 to the displaying section 190, indicates that the present humidity exceeds the objective humidity, and returns to step S390(step S410).

When it is judged in step S400 that the objective humidity is higher than the present humidity, control section 150 compares the present temperature sensed in step S330 with a reference temperature(step S420).

When it is judged in step S420 that the present temperature is higher than the reference temperature, control section 150 outputs the first driving control signal 151 to the heater driving section 160, stops a heater humidification and executes an ultrasonic humidification(steps S430 and S440).

When it is judged in step S420 that the present temperature is not higher than the reference temperature, control section 150 outputs the first and second driving control signals 151, 152 to the heater driving section 160 and the vibrator driving section 170, respectively, and executes the heater humidification and the ultrasonic humidification (steps S450 and S460).

In step S470, control section 150 compares the present illuminance sensed in step S340 with a reference illuminance.

When it is judged in step S470 that the present illuminance is higher than the reference illuminance, control section 150 provides the first, second and third driving control signal 151, 152, 153 to the heater driving section 160, the vibrator driving section 170 and the motor driving section 180, respectively, and executes the humidification mode of the humidifier in a normal humidification mode (step S480).

When it is judged in step S470 that the present illuminance is not higher than the reference illuminance, control section 150 provides the first, second and third driving control signal 151, 152, 153 to the heater driving section 160, the vibrator driving section 170 and the motor driving section 180, respectively, and executes the humidification mode of the humidifier in a sleeping humidification mode (step S480).

In the method and apparatus for controlling an operation of a humidifier according to the present invention, when the present illuminance sensed around a humidifier is lower than the reference illuminance, the humidification mode of the humidifier is executed in a sleep mode in which a humidification amount is low, so that the humidifier provides an agreeable sleeping environment when a user sleeps.

In addition, when the present temperature sensed around the humidifier is higher than the reference temperature, the humidifier operates in an ultrasonic humidification mode. When the presently-sensed temperature is lower than the reference temperature, the humidifier operates in the heater humidification mode in combination with the ultrasonic humidification mode. Consequently, the humidifier provides an environment where the air has an agreeable level of the humidity.

While the present invention has been particularly shown and described with reference to a particular embodiment thereof, it will be understood by those skilled in the art that various changes in form and details may be effected therein without departing from the spirit and scope of the invention as defined by the appended claims.

What is claimed is:

1. A method for controlling an operation of a humidifier, said method comprising the steps of:

(i) sensing a present humidity, a present temperature and a present illuminance inside a room;

(ii) judging whether or not water exists in a humidifying chamber after whether a user operates a power switch to supply a power source;

(iii) setting an objective humidity and comparing the set objective humidity with the present humidity sensed in step (i) when it is judged in step (ii) that the water exists in the humidifying chamber;

(iv) selecting and executing a humidifying method based on the present temperature sensed in step (i) when it is judged in step (iii) that the objective humidity is higher than the present humidity; and (v) selecting a humidification mode and executing a humidifying operation in the selected mode based on the present illuminance sensed in step (i).

2. The method for controlling an operation of a humidifier as claimed in claim 1, wherein said step (i) comprises the substeps of:

(i-1) judging whether or not the power source is supplied to a humidifier based on whether the user plugs in an external power plug;

(i-2) executing the step (i-1) repeatedly when it is judged in step (i-1) that the power source is not supplied; and (i-3) sensing the present humidity, the present temperature and the present illuminance inside the room when it is judged in step (i-1) that the power source is supplied.

3. The method for controlling an operation of a humidifier as claimed in claim 1, wherein said step (ii) comprises the substeps of:

(ii-1) judging whether or not the power switch is turned ON by the user;

(ii-2) returning to step (i) when it is judged in step (ii-1) that the power switch is not turned ON;

(ii-3) judging whether or not water exists in the humidifying chamber when it is judged in step (ii-1) that the power switch is turned ON;

(ii-4) returning to step (i) when it is judged in step (ii-3) that the water does not exist in the humidifying chamber; and (ii-5) proceeding to the next step when it is judged in step (ii-3) that the water exists in the humidifying chamber.

4. The method for controlling an operation of a humidifier as claimed in claim 3, further comprising the substep of:

generating a warning signal and returning to step (i) when it is judged in step (ii-3) that the water does not exist in the humidifying chamber.

5. The method for controlling an operation of a humidifier as claimed in claim 1, wherein said step (iii) comprises the substeps of:

(iii-1) inputting and storing the objective humidity set by the user;

(iii-2) comparing the present humidity sensed in step (i) with the objective humidity set in step (iii-1);

(iii-3) proceeding to the next step when it is judged in step (iii-2) that the objective humidity is higher than the present humidity; and (iii-4) returning to step (iii-1) when it is judged in step (iii-2) that the objective humidity is not higher than the present humidity.

6. The method for controlling an operation of a humidifier as claimed in claim 5, further comprising the substep of:

displaying that the present humidity exceeds the objective humidity and returning to step (iii-2) when it is judged in step (iii-2) that the objective humidity is not higher than the present humidity.

7. The method for controlling an operation of a humidifier as claimed in claim 1, wherein said step (iv) comprises the substeps of:

(iv-1) comparing the present temperature sensed in step (i) with a reference temperature;

(iv-2) stopping a heater humidification and executing an ultrasonic humidification when it is judged in step (iv-1) that the present temperature is higher than the reference temperature; and (iv-3) executing the heater humidification and the ultrasonic humidification when it is judged in step (iv-1) that the present temperature is not higher than the reference temperature.

8. The method for controlling an operation of a humidifier as claimed in claim 1, wherein said step (v) comprises the substeps of:

(v-1) comparing the present illuminance sensed in step (i) with a reference illuminance;

(v-2) executing a normal humidification mode when it is judged in step (v-1) that the present illuminance is higher than the reference illuminance; and (v-3) executing a sleeping humidification mode when it is judged in step (v-1) that the present illuminance is not higher than the reference illuminance.

9. The method for controlling an operation of a humidifier as claimed in claim 8, wherein a humidity amount during the sleeping humidification mode is less than a humidity amount during the normal humidification mode.

10. The method for controlling an operation of a humidifier as claimed in claim 1, further comprising the substep of:

starting an operation of an electric motor when it is judged in step (ii) that the water exists in the humidifying chamber.

11. A method for controlling an operation of a humidifier, said method comprising the steps of:

(A) judging whether or not the power source is supplied to a humidifier based on whether a user plugs in an external power plug;

(B) executing the step (A) repeatedly when it is judged in step (A) that the power source is not supplied;

(C) sensing a present humidity, a present temperature and a present illuminance inside a room when it is judged in step (A) that the power source is supplied;

(D) judging whether or not a power switch is turned ON by the user;

(E) returning to step (C) when it is judged in step (D) that the power switch is not turned ON;

(F) judging whether or not water exists in a humidifying chamber when it is judged in step (D) that the power switch is turned ON;

(G) generating a warning signal and returning to step (C) when it is judged in step (F) that the water does not exist in the humidifying chamber;

(H) starting an operation of an electric motor when it is judged in step (F) that the water exists in the humidifying chamber;

(I) inputting and storing an objective humidity set by the user;

(J) comparing the present humidity sensed in step (C) with the objective humidity set in step (I);

(K) displaying that the present humidity exceeds the objective humidity and returning to step (I) when it is judged in step (J) that the objective humidity is not higher than the present humidity;

(L) comparing the present temperature sensed in step (C) with a reference temperature when it is judged in step (J) that the objective humidity is higher than the present humidity;

(M) stopping a heater humidification and executing an ultrasonic humidification when it is judged in step (L) that the present temperature is higher than the reference temperature;

(N) executing the heater humidification and the ultrasonic humidification when it is judged in step (L) that the present temperature is not higher than the reference temperature;

(O) comparing the present illuminance sensed in step (C) with a reference illuminance;

(P) executing a normal humidification mode when it is judged in step (O) that the present illuminance is higher than the reference illuminance; and (Q) executing a sleeping humidification mode when it is judged in step (O) that the present illuminance is not higher than the reference illuminance.

12. The method for controlling an operation of a humidifier as claimed in claim 10, wherein a humidity amount during the sleeping humidification mode is less than a humidity amount during the normal humidification mode.

13. An apparatus for controlling an operation of a humidifier, said apparatus comprising:

key inputting means for allowing a user to set humidifying operation conditions of a humidifier through keys thereof and for providing operation setting signals inputted through the keys by an user;

a humidity sensor for sensing a humidity inside a room to in which a humidifying operation is applied and for providing a sensed humidity signal;

a temperature sensor for sensing a temperature inside the room in which the humidifying operation is applied and for providing a sensed temperature signal;

a float switch for executing a switching operation based on a level of water flowed from a water chamber provided inside of the humidifier and for providing an ON/OFF switching signal;

an illuminance sensor for sensing an illuminance inside the room in which the humidifying operation is applied and for providing the sensed illuminance signal;

control means for providing first to third driving control signals in order to control a present humidity inside the room to obtain the objective humidity in response to the operation setting signals from said key inputting means, the sensed humidity signal from said humidity sensor, the sensed temperature signal from said temperature sensor, the on/off switching signal from said float switch, and the sensed illuminance signal from said illuminance sensor, and for providing a fourth driving control signal in order to control devices for displaying an operation state of the humidifier;

heater driving means for executing a heat humidifying operation by quantity of heat of a heater in response to the first driving control signal from said control means;

vibrator driving means for executing an ultrasonic humidifying operation by ultrasonic waves of a vibrator in response to the second driving control signal from said control means;

motor driving means, responsive to the third driving control signal from said control means, for driving a fan motor and a fan provided inside of the humidifier to send a power discharging vapor produced by the driving of the heater and the vibrator through an outlet of the humidifier to the periphery thereof;

displaying means, responsive to the fourth driving control signal from said control means, for driving a buzzer and operation display lamps informing that the water does not exist in a humidifying chamber; and a memory, responsive to a writing/reading control signal from said control means, for writing or reading data related to the operation setting signals from said key inputting means, and for sensing signals from said sensors.

* * * * *